(12) United States Patent
Dolph et al.

(10) Patent No.: US 7,474,317 B2
(45) Date of Patent: Jan. 6, 2009

(54) METHOD AND APPARATUS FOR DISPLAYING OVERLAPPING MARKERS

(75) Inventors: Blaine H. Dolph, Western Springs, IL (US); Christopher Joseph Gansen, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 11/419,096

(22) Filed: May 18, 2006

(65) Prior Publication Data

US 2007/0268313 A1   Nov. 22, 2007

(51) Int. Cl.
*G09G 5/00* (2006.01)
(52) U.S. Cl. .................... 345/629; 701/200; 345/619
(58) Field of Classification Search ........... 345/629
See application file for complete search history.

(56) References Cited

U.S. PATENT DOCUMENTS

| | | | |
|---|---|---|---|
| 5,377,314 A | 12/1994 | Bates et al. | |
| 5,553,209 A * | 9/1996 | Johnson et al. | 345/667 |
| 6,067,502 A | 5/2000 | Hayashida et al. | |
| 6,356,281 B1 | 3/2002 | Isenman | |
| 6,973,386 B2 * | 12/2005 | Gibbs | 701/208 |
| 6,995,778 B2 | 2/2006 | Noble et al. | |
| 2002/0175923 A1 | 11/2002 | Lin et al. | |
| 2005/0034075 A1 * | 2/2005 | Riegelman et al. | 715/714 |
| 2005/0083325 A1 | 4/2005 | Cho | |
| 2006/0058952 A1 * | 3/2006 | Cooper et al. | 701/208 |
| 2007/0219659 A1 * | 9/2007 | Abhyanker et al. | 700/98 |
| 2007/0268310 A1 | 11/2007 | Dolph et al. | |

* cited by examiner

*Primary Examiner*—Kee M Tung
*Assistant Examiner*—Michelle K Lay
(74) *Attorney, Agent, or Firm*—Duke W. Yee; David A. Mims, Jr.; Gerald H. Glanzman

(57) ABSTRACT

A computer implemented method, apparatus, and computer usable code for rendering graphical markers in a manner that avoids overlap of graphical markers on a map display. The process identifies a plurality of points for display from data describing locations and associated data about locations. The process determines whether displaying graphical markers for a set of points in the plurality of points will result in graphical markers overlapping each other. If the process determines that displaying graphical markers for the set of points will result in graphical markers overlapping each other, the process displays the graphical markers for the set of points in an arrangement that avoids overlap. Each graphical marker representing a point in the set of points does not overlap with any other marker associated with the map display when displayed in the arrangement that avoids overlap.

11 Claims, 6 Drawing Sheets

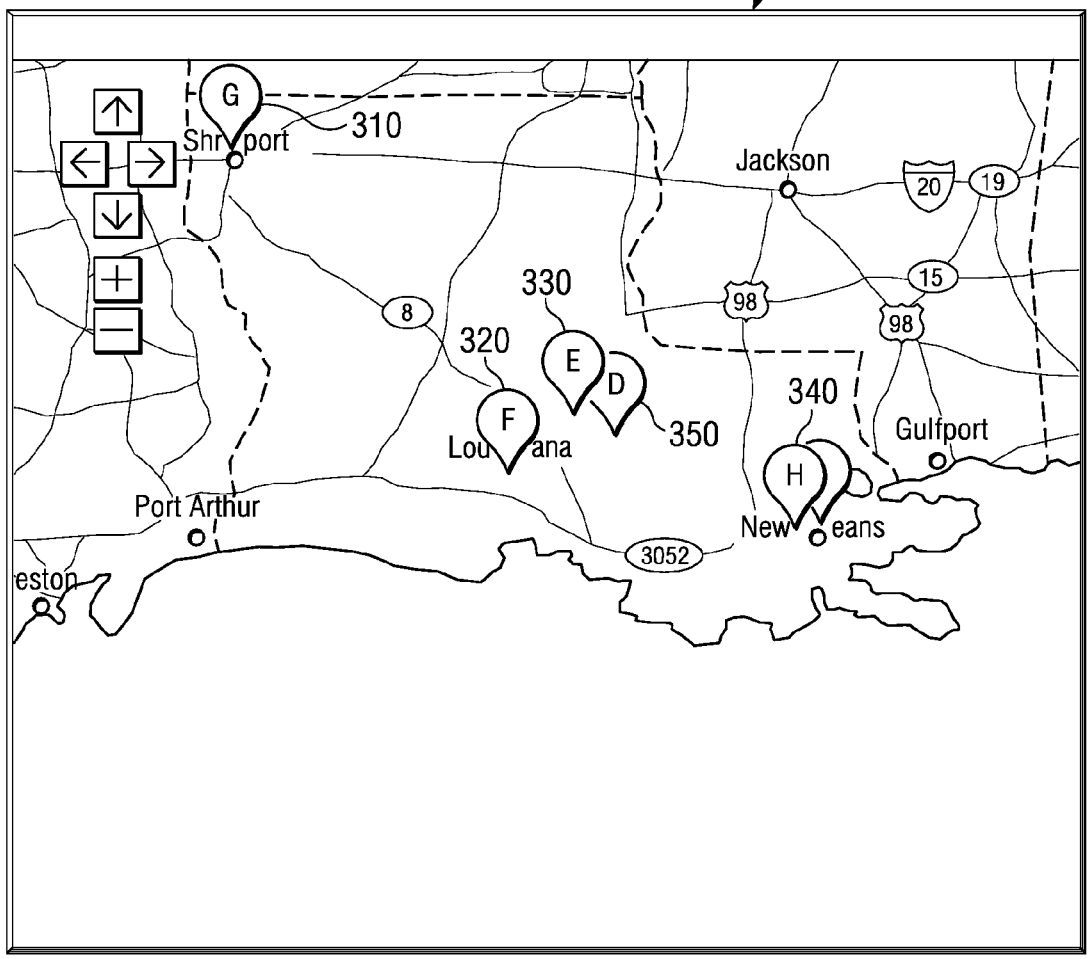

```
function detect_overlap(Point A, Point B)
{
    if ( [ left bound of A is between the left and right bounds of B OR
right bound of A is in between left and right bounds of B] AND
        [ bottom bound of A is between upper and lower bounds of B OR top
bound of A is between upper and lower bounds of B])
    then
        points overlap
    else
        points do not overlap
}
```

710 — (if condition block)
720 — points overlap
730 — points do not overlap
700 — (entire function)

```
function map_to_pixels(MapPoint p)
{
    x_pixels = [ (p.x - left_bound) / (right_bound - left_bound) ] * bounding_box_width_in_pixels;
    y_pixels = [ (p.y - top_bound) / (bottom_bound - top_bound) ] * bounding_box_height_in_pixels;

return array(x_pixels, y_pixels);
}
```

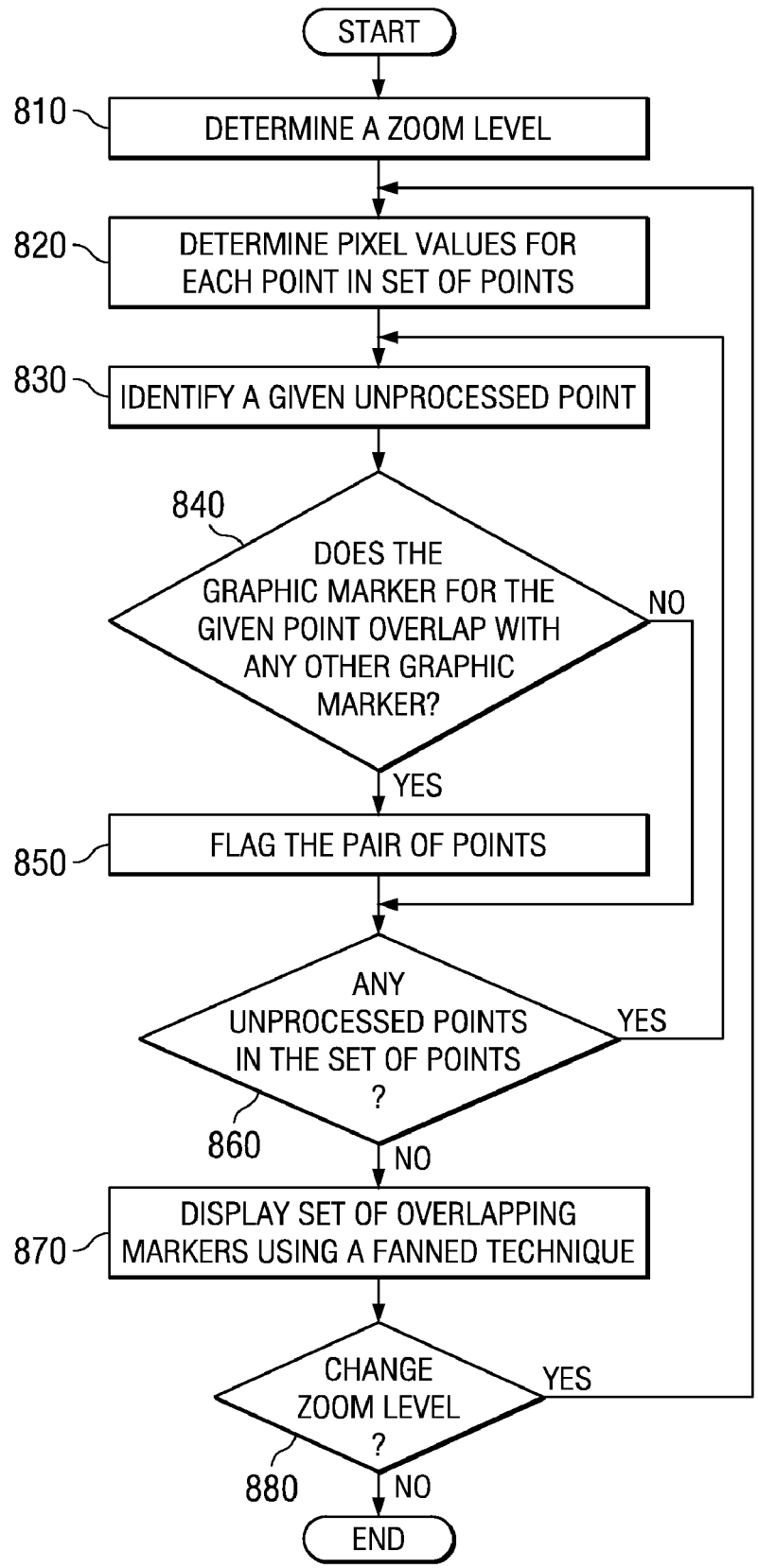

METHOD AND APPARATUS FOR DISPLAYING OVERLAPPING MARKERS

BACKGROUND OF THE INVENTION

1. Field of the Invention

The present invention relates generally to an improved data processing system and in particular to a method and apparatus for displaying maps. Still more particularly, the present invention relates to a computer implemented method, apparatus, and computer usable program product for optimizing the placement of overlapping markers in a mapping application.

2. Description of the Related Art

Currently, many applications use geospatial data to enhance the user experience. Geospatial data is information that is both geographic and spatial pertaining to a location of natural or constructed features, objects, and/or structures. For example, latitude and longitude coordinates are a type of geospatial data. Geospatial data can be used to enhance application functions. Many data providers are now tagging data with latitude and longitude coordinates.

In addition, the advent of mapping applications that are freely available to users, such as Google® maps, enable users to easily integrate geospatial data into a map display. For example, the Chicago police now plot the occurrence of crimes by the type of crime and geographic location of crimes across Chicago neighborhoods. As another example, Google® mapping functions permit users to obtain driving directions using maps.

When geospatial data is integrated into a map display, each location point associated with geospatial data is typically represented as a graphical marker, icon, or indicator on a map display. When large data sets representing a plurality of points are mapped, the markers may overlap. This overlap can occur where two or more points actually have the same location. In addition, overlap can also occurs where points have different locations but graphical markers representing the points overlap due to the zoom level of the map view. For example, where two points are located in different locations but in close proximity to each other, the graphical markers for the two points may overlap in a zoomed-in view, but appear as distinct, non-overlapping markers when the map is viewed in a zoomed-out view.

The overlapping of graphical markers representing points and/or locations on a map results in problems because the overlap hides or obscures some of the data such that a user cannot clearly view each point and/or location indicator. This overlap can cause confusion to a user attempting to locate a marker that is hidden or obscured by another marker.

SUMMARY OF THE INVENTION

The different illustrative embodiments provide a computer implemented method, apparatus, and computer usable program product for rendering graphical markers in a manner that avoids overlap of graphical markers on a map display. The process identifies a plurality of points for display from data describing locations and associated data about locations. The process determines whether displaying graphical markers for a set of points in the plurality of points will result in graphical markers overlapping each other. If the process determines that displaying graphical markers for the set of points will result in graphical markers overlapping each other, the process displays the graphical markers for the set of points in an arrangement that avoids overlap. Each graphical marker representing a point in the set of points does not overlap with any other marker associated with the map display when displayed in the arrangement that avoids overlap.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3B is a block diagram of a map display showing another currently used display of overlapping graphical markers at a different zoom level;

FIG. 7 is an example of an algorithm for converting geospatial data associated with a data set to pixel values to form a set of plotted points; and FIG. 8 is overlap-detection function for identifying a pair of overlapping graphical markers in accordance with an illustrative embodiment.

DETAILED DESCRIPTION OF THE PREFERRED EMBODIMENT

Figure 1:
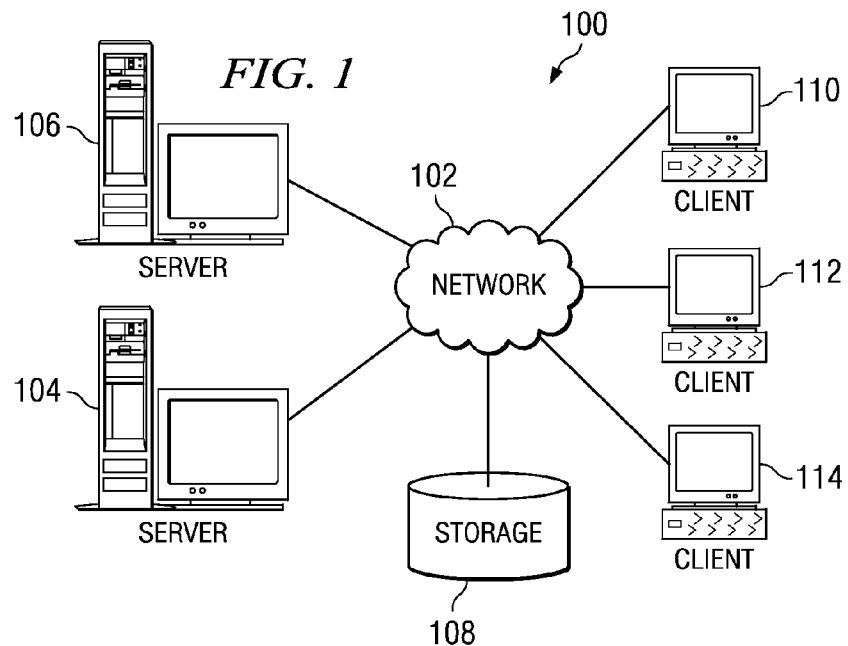
FIG. 1 is a pictorial representation of a network of data processing systems in which illustrative embodiments may be implemented.
Figure 2:
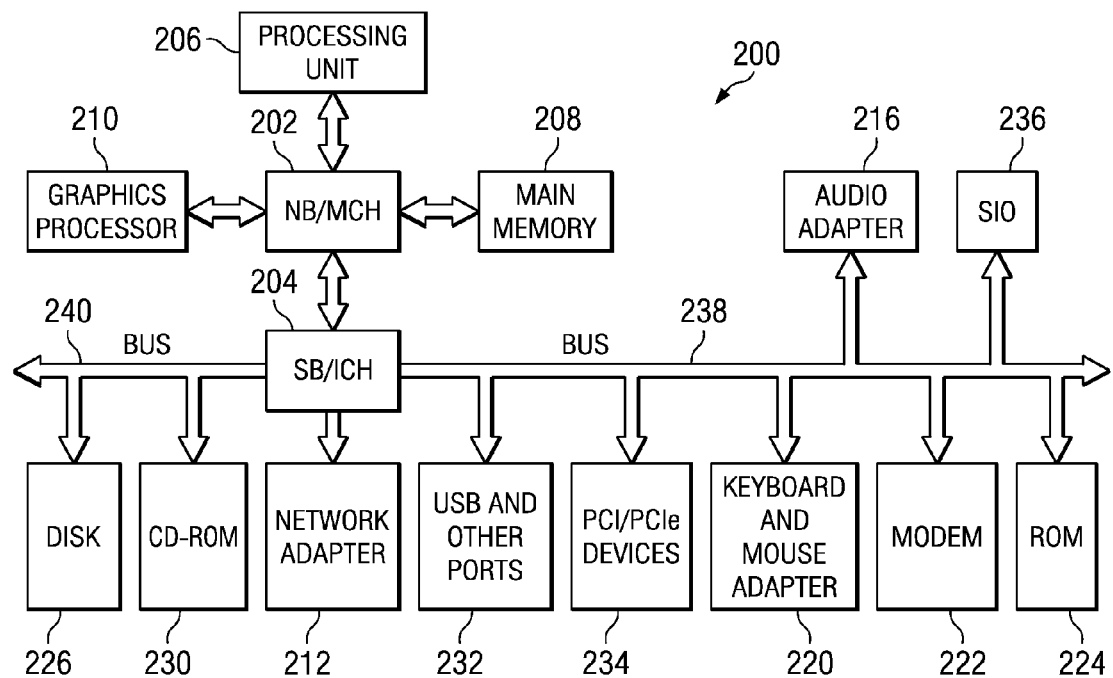
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Today, many data providers are tagging their data with geospatial data. Geospatial data is information pertaining to a geographic location of natural or constructed features, structures, and/or objects. Geospatial data includes data that is both geographic and spatial. For example, latitude and longitude coordinates are a type of geospatial data. Mapping applications, such as Google® maps, enable users to integrate geospatial data into a map display to represent information, such as a set of locations or addresses, as one or more graphical markers rendered in association with the map display.

As used herein, a point is a place, position, or locality. Each mapped point is represented on a map display by a graphical marker. As used herein, a graphical marker is a visual indicator rendered on a map display to represent a point on a map display. This point in these illustrative examples is relative to a map display bounding box and/or one or more other points associated with the map display. A graphical marker may take various forms, for example, an, image, icon, figure, character, symbol, letter, number, thumbnail image, or word. In these examples, a bounding box is the smallest upright rectangle, which entirely encloses a figure on a display, such as a map display. Thus, in this example, a map display bounding box is the smallest upright rectangle which entirely encloses the map display. A graphic icon bounding box is the smallest upright rectangle which entirely encloses the graphical marker.

When large data sets representing a plurality of points are rendered on a map display, the graphical markers associated with the plurality of points rendered on the map may overlap where the points are located at the same coordinates as one or more other mapped points or in close proximity to one or more other mapped points. The degree of overlap that occurs between a given pair of graphical markers is influenced by the zoom level of a map display view. Thus, two graphical markers may overlap in a zoomed-in view, but appear as distinct, non-overlapping markers when the map is viewed in a zoomed-out view.

For example, if a user conducts a search to find a list of available jobs within a particular geographical area, the search will return a result data set. In this example, the returned result data set includes a list of available jobs and/or locations, such as the following:

| | |
|---|---|
| A | Boat Operator |
| B | Store Human Resources Manager-Harahan, LA |
| C | Retail Sales Consultant, Harahan |
| D | Applications Controls Engineer |
| E | Websphere Administrator |
| F | Mine Maintenance Mechanic |
| G | Industrial Hygienist |
| H | Oracle 11i Financials (Technical) |

With this example, each available job is associated with an alphabet letter identifier. The identifiers range from A to H, inclusive. Each available job location can be rendered on a map display as a graphical marker labeled with the appropriate identifier associated with the given available job. The set of graphical markers associated with the result set of available jobs are rendered on a map display to represent the location of each available job in a result data set.

Figure 3A:
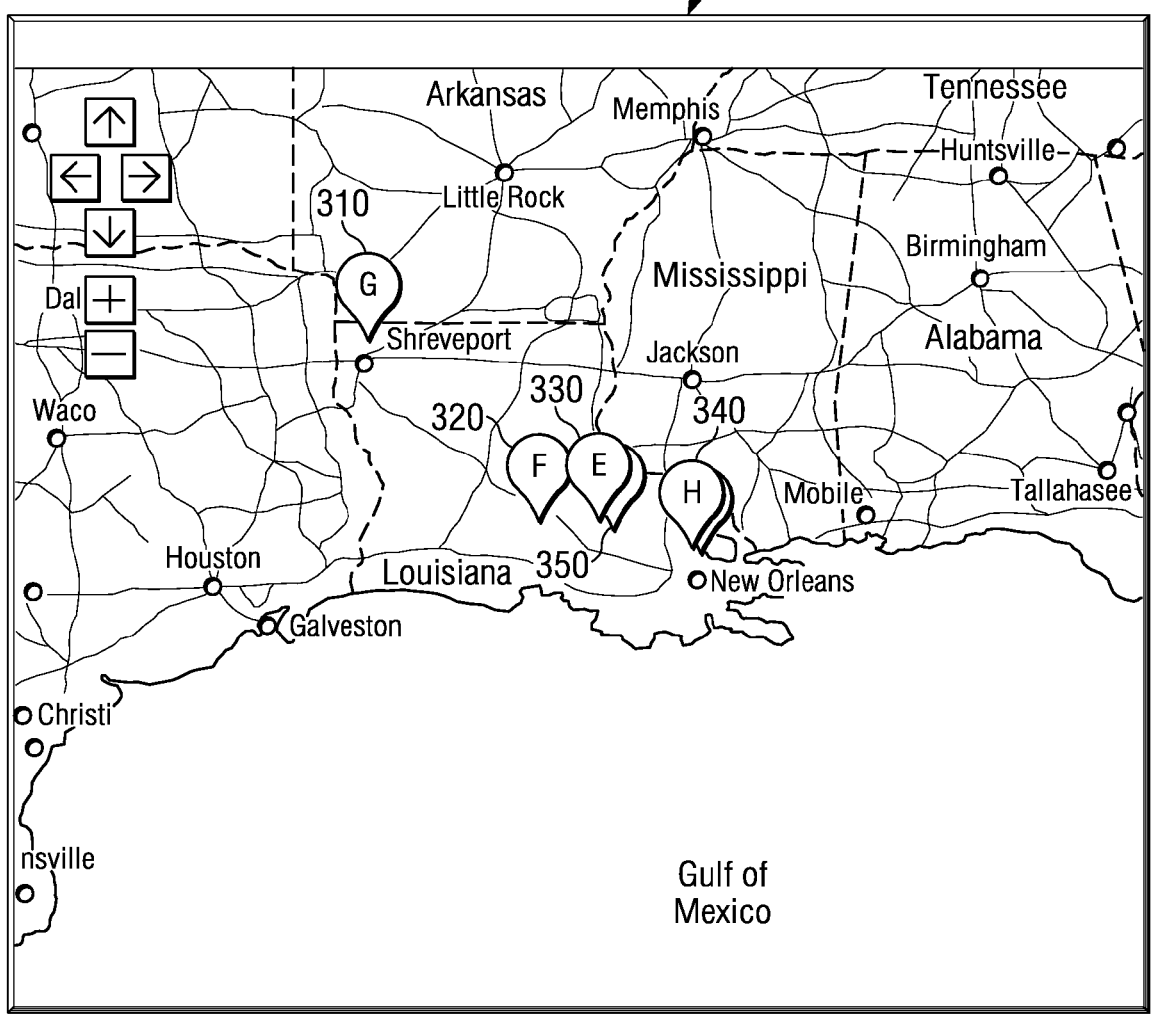
FIG. 3A is a block diagram of a map display showing a currently used display of overlapping graphical markers.

Referring now to FIG. 3A, which is a block diagram of a map display having overlapping graphical markers, when the result data set of available jobs is rendered as a plurality of graphical markers on a map display, some of the graphical markers overlap. Map display 300 is any type of graphic map display generated by a mapping application, such as Google® maps. Map display 300 is rendered in association with a plurality of points represented on map display 300 as a plurality of graphical markers 310-340.

For example, as shown in FIG. 3A, graphical markers for points represented by graphic marker G 310, graphic marker F 320, graphic marker E 330, and graphic marker H 340 are visible on the map display. However, graphic marker A, graphic marker B, graphic marker C, and graphic marker D are hidden or obscured by other graphic markers, such as graphic marker F 320, graphic marker E 330, and graphic marker H 340, due to overlap of the markers at the given zoom level for the map view shown in FIG. 3A. As used herein, the term overlap refers to the obscuring or hiding of a portion of a graphical marker or all of a graphical marker by one or more other graphical markers rendered on the same display. Thus, a graphical marker may overlap with only one other graphical marker, such as in a single layer overlap, or a graphical marker may be overlapped by multiple other graphical markers, such as a multiple layer or stacked overlap.

Referring now to FIG. 3B, which is a block diagram of a map display with overlapping graphical markers at a different zoom level in accordance with an illustrative example, as a user zooms-in on the map display view, the overlap of the graphical markers is diminished. Map display 300 is any type of graphical map display generated by a mapping application, such as Google® maps. Graphic marker D 350, which was completely hidden or obscured at the zoom level shown in FIG. 3A is partially visible at the zoom-in view of map display shown in FIG. 3B.

The term "zoom-in" refers to decreasing the field of vision/display by changing the view from wide to narrower. Zooming-in typically increases the amount of detail over a narrower or smaller area of a map or image, such as the effect of increasing a magnification level. The term "zoom-out" refers to increasing the field of vision by changing the view from narrow to a wider view. Zooming-out typically displays a larger or wider area but with a decreased amount of detail over that area, such as the effect of decreasing a magnification level. Generally, mapping functions provide multiple levels of zoom-in and zoom-out. A zoom level refers to the particular level of zoom-in or zoom-out option enabled by a user in regard to a particular map display.

In addition, a graphical marker may be overlapped by another graphical marker in whole or in part. In accordance with one illustrative example, a graphical marker is overlapped by another graphical marker if an identifier associated with the graphical marker is overlapped, hidden, or obscured by another graphical marker. In this illustrative example, graphic marker D 350 is partially hidden or overlapped by graphic marker E 330. However, because graphical marker D 350 has an identifier "D" that is not blocked, hidden, or otherwise obscured by graphic marker E 330, graphic marker E 330 does not overlap with graphic marker D 350. In other words, graphic marker E 330 does not overlap with graphic marker D 350 because an identifier "D" associated with graphic marker D 350 is not obscured by the other given graphical marker on the map display. However, in accordance with this example, graphic marker E 330 and graphic marker D 350 could be overlapping or hiding one or more other graphical markers that are not visible in this zoom level.

Figure 3C:
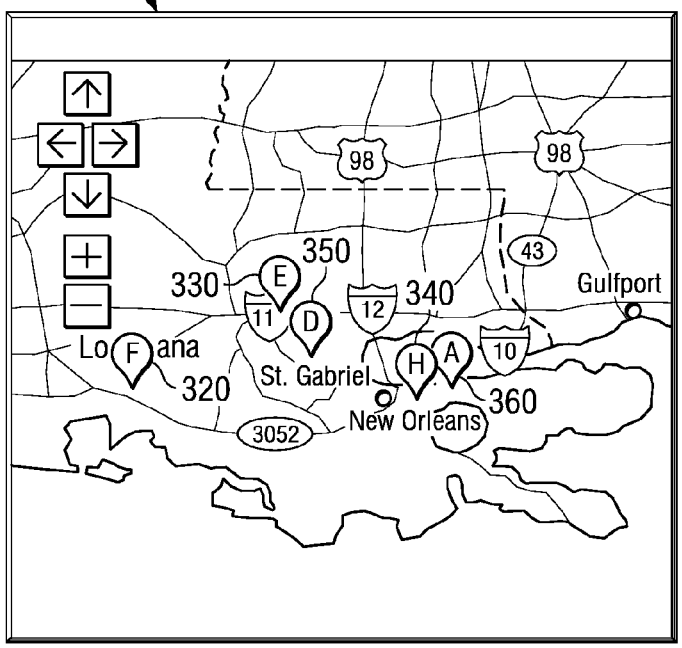
FIG. 3C is another block diagram of a map display showing a currently used display of overlapping graphical markers with a diminishing overlap of graphical markers at a different zoom level.

FIG. 3C is another block diagram of a map display showing a diminishing overlap of graphical markers at a different zoom level in accordance with an illustrative embodiment. Map display 300 is any type of graphic map display generated by a mapping application, such as Google® maps.

In this illustrative example, a user has zoomed-in to increase a magnification level of the map display. Graphic marker D 350, which was completely obscured in FIG. 3A and partially obscured in FIG. 3B, is completely visible to a user at the zoom-in level of the map display shown in FIG. 3C. In addition, graphic marker A 360, which was obscured in FIGS. 3A and 3B, is partially visible at the zoom-in level illustrated in FIG. 3C. Thus, as a user zooms-in, such as to increase the magnification level of the map display, the overlap of graphical markers may be diminished. However, even at the zoomed-in view shown in FIG. 3C, graphic marker B and graphic marker C are still not visible to a user. The overlapping of graphical markers obscures mapped points such that a user cannot clearly view each mapped point. This obscuring of mapped points and data related to mapped points can additionally lead to user confusion.

Therefore, the different illustrative embodiments provide a computer implemented method, apparatus, and computer usable code for optimizing placement of overlapping graphical markers in a geographic mapping application using a fanned technique. The process converts geospatial data associated with a data set to pixel values to form a plurality of plotted points. The process identifies a set of graphical markers for a set of points that will overlap when displayed on the map display.

In response to identifying the set of overlapping graphical markers, the process displays the set of overlapping graphical markers for the set of points in a manner that avoids overlap of the graphical markers for the set of points. In accordance with an illustrative embodiment, the set of graphical markers are displayed in a fan-shaped arrangement about a central point associated with the set of overlapping graphical markers to avoid overlap of the graphical markers. Markers arranged in a fan-shaped arrangement about a central point do not overlap with any other graphical marker associated with the map display.

As used herein, a plotted point is a mapped point with pixel values representing the location of the point relative to a particular map display and/or relative to one or more other points associated with the map display. An overlapping graphical marker is a graphical marker that overlaps, in whole or in part, with one or more other graphical markers when rendered on a particular map display at a given zoom level. Graphical markers for the plurality of plotted points are rendered on a given map display in accordance with a pixel value for each plotted point. Thus, a graphical marker for a point can be an overlapping graphical marker at one zoom level and a non-overlapping graphical marker at a different zoom level. As used herein, a non-overlapping graphical marker is a graphical marker that does not hide or obscure another graphical marker associated with a given map display. In accordance with another illustrative example, a non-overlapping graphical marker is a graphical marker that does not hide or obscure an identifier of another graphical marker associated with the map display.

The term "set of overlapping graphical markers" includes a single pair of overlapping graphical markers, as well as three or more overlapping graphical markers. An overlapping graphical includes a graphical marker that overlaps with a single other graphical marker, as well as a graphical marker that overlaps two or more other graphical markers.

Figure 4:
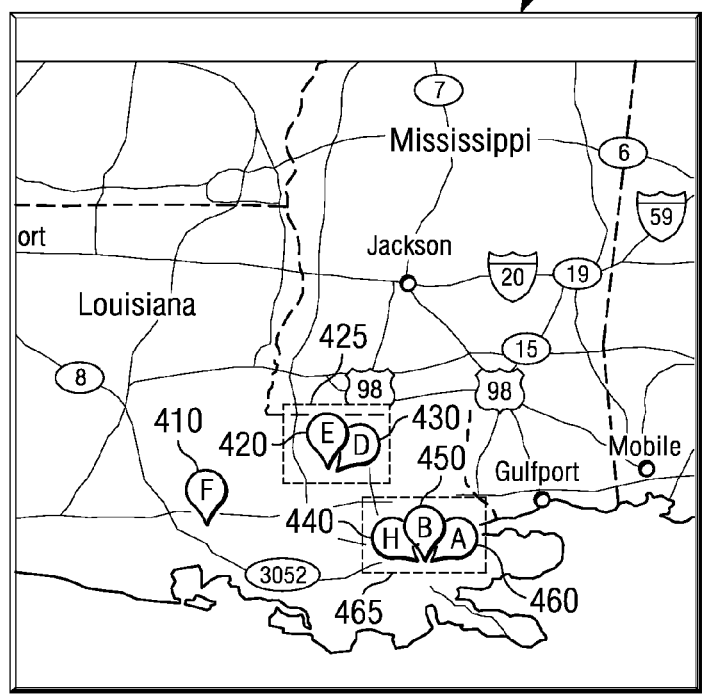
FIG. 4 is a block diagram of a map display showing two sets of graphical markers displayed in a non-overlapping, fan-shaped arrangement in accordance with an illustrative embodiment.

FIG. 4 depicts a block diagram of a map display showing two sets of graphical markers displayed in a non-overlapping, fan-shaped arrangement in accordance with an illustrative embodiment. Map display 400 is any type of graphical map display generated by a mapping application, such as Google® maps. Map display 400 is rendered in association with a plurality of plotted points represented on map display 400 as a plurality of graphic markers 410-460.

Graphic marker F 410 is a single graphic marker representing a single point. Graphic marker E 420 and graphic marker D 430 are displayed in a fan-shaped arrangement on map display 400 to form set of graphic markers 425. Set of graphic markers 425 comprises a single pair of graphic markers, graphic marker E 420 and graphic marker D 430. Set of graphic markers 425 represents a first identified set of overlapping graphic markers for a set of points identified from the plurality of points associated with map display 400.

Set of graphic markers 425 is displayed in a non-overlapping, fan-shaped arrangement at a central point associated with the set of overlapping graphical markers. Graphic marker E 420 and graphic marker D 430 do not overlap with any other graphical markers in the plurality of graphical markers associated with map display 400 because graphic marker E 420 and graphic marker D 430 are displayed in a fan-shaped manner such that each graphical marker is clearly visible and un-obscured by any other graphical when rendered on map display 400. In other words, graphic marker E 420 and graphic marker D 430 are displayed in a fanned manner such that graphic marker E 420 and graphic marker D 430 do not overlap in the manner shown for graphic marker E 330 and graphic marker D 350 in FIGS. 3A and 3B.

Graphic marker H 440, graphic marker B 450 and graphic marker C 460 are displayed in a fan-shaped arrangement on map display 400 to form set of fanned markers 465. Set of fanned markers 465 comprises three graphic markers, including graphic marker H 440, graphic marker B 450 and graphic marker C 460. Set of fanned markers 465 represents a second identified set of overlapping graphic markers associated with map display 400. Set of fanned markers 465 is displayed in a fan-shaped arrangement about a central point associated with the set of overlapping markers. Each graphical marker included in set of fanned markers 465 is arranged in a fanned manner to avoid overlap of the graphical markers.

In this illustrative example, each graphical marker associated with set of fanned markers 425 is a wedge-shaped graphical marker representing a different plotted point in the identified set of points associated with set of fanned markers 425. However, in accordance with an illustrative embodiment, each graphical marker associated with set of fanned markers 425 may be rendered as a graphical marker having any shape that is arranged in a fanned or angled arrangement about a central point such that each graphical marker in the set of graphical markers does not overlap with any other graphical marker associated with map display 400.

In this illustrative example, each graphical marker associated with set of fanned markers 425 and set of fanned markers 465 are displayed as graphical markers having the same size and shape. In accordance with another illustrative example, each graphical marker in set of fanned graphic markers 425 and set of fanned markers 465 do not have the same size and shape. For example, graphic marker H 440 and graphic marker C 460 can be displayed as a short tear-drop shaped graphical marker while graphic marker B 450 is displayed as an elongated or long, thin stretched marker with a smaller width and greater height than graphic marker H 440 and graphic marker C 460. In this manner, set of fanned markers 465 can accommodate a greater number of graphical markers in the fanned arrangement.

For example, if all graphical markers are rendered at the same pixel size and shape, a set of fanned markers, such as set of fanned markers 465, can only accommodate eight graphical markers arranged in a fanned manner. However, when graphical markers are displayed in different pixel size and a different shape of graphical marker, a greater number of graphical markers can be accommodated in a non-overlapping arrangement. For example, one or more graphical markers in an arrangement to avoid overlap can be displayed in a stretched manner. A graphical marker displayed in a stretched manner has a smaller width and a greater height than a graphical marker displayed in a non-stretched manner. Thus, in this example, when one or more graphical markers are displayed in a stretched manner in a fan-shaped arrangement, the set of fanned markers can accommodate a dozen graphical markers without resulting in any graphical markers in the set of fanned markers overlapping with any other graphical markers in the set of fanned markers. In accordance with this illustrative embodiment, graphical markers in the set of fanned markers can be displayed as markers having varying dimensions, such as width and height, in order to permit a varying number of graphical markers to be displayed in a single set of fanned markers.

In the illustrative embodiment shown in FIG. 4, each graphical marker in a set of fanned markers is displayed as an inverted tear-drop shaped graphical indicator. However, in accordance with the illustrative embodiments, a graphical marker displayed in a fanned shaped arrangement to form a set of fanned markers can be displayed in any shape, size, design, format, image, symbol, or any other graphic or image to indicate a point or location on a map display. In addition, a graphical marker can be displayed as a graphic having any color, border, and/or shading in association with the graphical marker. For example, a graphical marker can be displayed as a long, thin graphic, a balloon-shaped graphic in which a round or oval graphic is displayed at the end of a line or stem, a triangle or pie-slice shaped graphic, or any other size or shape of graphic that can be arranged in a fan-shaped manner about a central point to avoid overlap of each graphical marker.

In order to determine if a graphical marker is an overlapping graphical marker at a given zoom level, information describing locations and associated data about locations is identified. This geospatial data describing locations and data about locations is converted to a plurality of plotted points. The process determines a physical distance represented between pixels for a given zoom level of a map display. The physical distance represented can vary from one zoom level to another zoom level for a given map display. Geospatial data is converted to a plurality of plotted points based on the physical distance between pixels. The pixel value associated with a particular plotted point identifies a location on the map display for the point relative to a bounding box for the map display. Each plotted point is represented as a graphical marker on a given map display.

The illustrative embodiments provide a computer implemented method, apparatus, and computer usable code for rendering graphic markers on a map display to avoid overlapping graphical markers by using a fanned technique to arrange the graphical markers on the map display. The process converts geospatial data associated with a data set to pixel values to form a set of plotted points. In response to identifying a given set of points associated with overlapping graphical markers, the process displays a set of overlapping graphical markers in an arrangement that avoids overlap of the graphical markers. In this illustrative example, the process displays the overlapping graphical markers in a fan-shaped arrangement to prevent overlap of the markers. In a fan-shaped arrangement, a set of graphical markers are displayed in a fanned manner about a central point to form a set of fanned markers. Graphical markers in the set of fanned markers are non-overlapping markers. In other words, the graphical markers arranged in a fan-shaped arrangement about a central point do not overlap any other marker associated with the map display.

In accordance with another illustrative embodiment, a set of overlapping graphical markers are displayed in a hub and spoke manner to prevent overlap of the graphical markers. In a hub and spoke manner, each graphical marker is displayed as a spoke branching off a central point to form a circular pattern. In other words, each graphical marker attaches to a central point in a circular pattern, like a spoke in a wheel. The hub and spokes arrangement about a central point forms a circle or wheel shaped set of graphical markers. Each graphical marker displayed in a hub and spokes manner does not overlap with any other graphical marker in arranged in the hub and spokes manner.

Figures 5, 6:
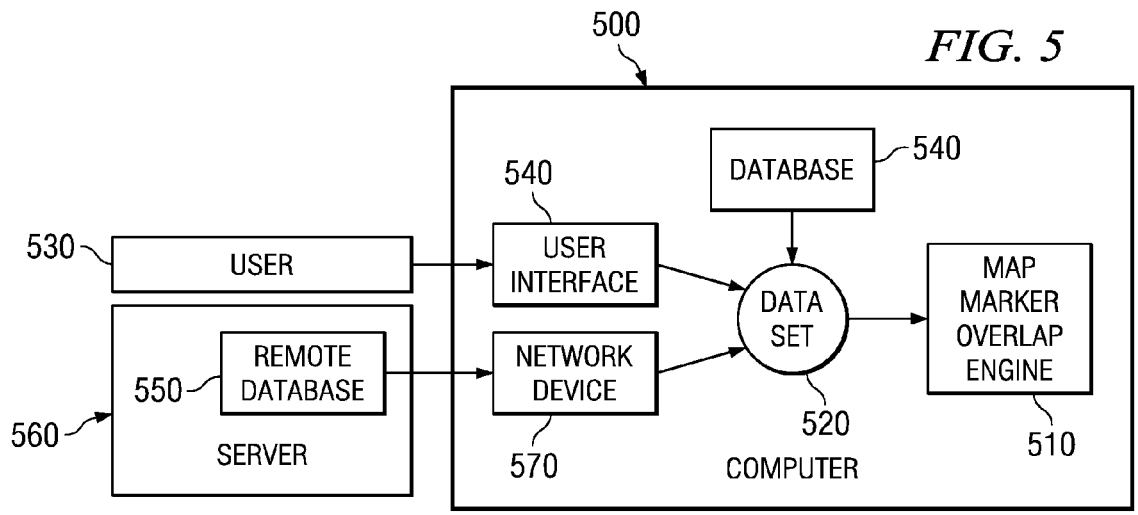
FIG. 5 is a block diagram illustrating a dataflow when the process identifies a set of overlapping graphical markers for display in association with a given map display using a fanned technique in accordance with an illustrative embodiment.
FIG. 6 is a flowchart illustrating a process for displaying a set of overlapping graphical markers in a non-overlapping arrangement by using a fanned technique in accordance with an illustrative embodiment.

FIG. 5 is a block diagram illustrating a dataflow when the process identifies a set of overlapping graphical markers for display in association with a given map display using a fanned technique in accordance with an illustrative embodiment. Computer 500 is any type of computing device, such as a personal computer, laptop, personal digital assistant, or any other computing device depicted in FIGS. 1 and 2. Map marker overlap engine 510 is a mapping application. Map marker overlap engine 510 converts geospatial data associated with a data set into pixel values associated with a given map display to form a plurality of plotted points. Map marker overlap engine 510 identifies set(s) of overlapping graphical markers. Map marker overlap engine displays the set(s) of overlapping graphical markers as a set of graphical markers arranged in a manner that prevents overlap of the graphical markers. In this illustrative example, map marker overlap engine arranges the set of overlapping graphical markers in a fanned arrangement about a central point associated with the given set of overlapping graphical markers.

Map marker overlap engine 510 receives the data set and associated geospatial data as a data set, such as data set 520. Data set 520 includes data describing locations and associated data about locations.

Data set 520 can be received from a plurality of different sources. In accordance with this illustrative example, user 530 provides data set 520 to map marker overlap engine 510 via user interface 540. User interface 540 is any type of known or available interface for providing input to computer 500, including but not limited to, a graphical user interface (GUI), a menu-driven interface, and/or a command line interface.

Map marker overlap engine 510 can also retrieve and/or receive data set 520 from a local database located on computer 500, such as database 545. Database 545 is a database for storing information, such as locations, addresses, or any other data in conjunction with geospatial data associated with the stored information. Database 545 is located on or locally to computer 500.

In addition, map marker overlap engine 510 also receives data set(s), such as data set 520, from a remote database, such as remote database 550. Remote database 550 is any type of database for storing a collection of data that is not located on computer 500. In this illustrative example, remote database 550 is located on server 560.

Server 560 is any type of server, such as server 104 and 106 in FIG. 1. Server 560 can be a server on a network, such as network 102 described in FIG. 1. Computer 500 accesses remote database 550 on server 560 through a network connection via network device 570.

Network device 570 is any type of network access software known or available for allowing computer 500 to access a network. Network device 570 connects to a network connection, such as network 102 in FIG. 1. The network connection permits access to any type of network, such as a local area network (LAN), a wide area network (WAN), or the Internet.

Map marker overlap engine 510 receives data set 520. Map marker overlap engine 510 utilizes geospatial data in data set 520 to determine a pixel value for a plurality of points to be displayed in association with a given map display. Map marker overlap engine 510 converts geospatial data into pixel values for the given map display by determining the physical distance that is represented between pixels associated with the given map display. Map marker overlap engine 510 then converts the geospatial data for each point or location in data set 520 into a pixel location to form a plotted point. This geospatial data may be for example latitude and longitude coordinates.

Map marker overlap engine 510 determines whether displaying graphical markers for a set of points in the plurality of plotted points will result in overlapping graphical markers. Map marker overlap engine 510 utilizes a known pixel size for a graphical marker to identify one or more set(s) of points that will result in overlap of graphical markers. A set of overlapping graphical markers comprises at least one graphical marker that will wholly or partially overlap one or more other graphical markers when the graphical is rendered in association with the map display in accordance with a pixel value for each point and a pixel size for each graphical marker. In other words, map marker overlap engine 510 determines a position for each graphical marker relative to a bounding box for a given map display and/or relative to every other graphical marker to be displayed and identifies graphical markers that will occupy the same pixel locations causing graphical marker overlap when rendered on a given map display.

Map marker overlap engine 510 optimizes the display of overlapping markers by rendering overlapping markers in an arrangement that prevent overlap. For example, overlapping markers are rendered in a fanned manner such that none of the rendered graphical markers overlap any other rendered graphical marker. In other words, the pixels occupied by each graphical marker do not occupy the same pixel position as another graphical marker so that no graphical marker is obscured or hidden behind another rendered graphical marker.

In order to convert geospatial data into pixel values for a given map display, map marker overlap engine 510 determines the dimensions of a bounding box for the given map display in pixels. Map marker overlap engine 510 determines the geographic coordinates, such as latitude and longitude, for each point in data set 520. Map marker overlap engine 510 establishes the pixel location for each point in the plurality of points represented by information in data set 520 rather than a latitude and longitude location in order to determine whether points will overlap when displayed on the given map display. In other words, visual overlap cannot be determined based on geographic coordinates alone except where geographic coordinates are identical due to differences in the magnification level of different zoom levels for a map display.

Map marker overlap engine plots the set of overlapping graphical markers for display in a fanned manner by calculating a central point or centroid of a bounding polygon associated with the set of fanned markers. In this example, a bounding polygon is the smallest polygon shaped box enclosing the known pixel size for the set of fanned markers. Each graphical marker representing a plotted point in the set of fanned markers is rendered as a wedge-shaped graphical marker positioned at the central point of the bounding polygon to form the set of fanned markers.

In accordance with an illustrative embodiment, each time a user changes a zoom level of a map display, the map marker overlap engine recalculates a pixel value for each point and performs a new set of overlap detection functions for each pair of plotted points to identify any sets of overlapping graphical markers.

In accordance with anther illustrative embodiment, each graphical marker in a fanned graphical marker is a wedge-shaped graphical marker of a predetermined pixel size. For example, each wedge in a fanned graphical marker can be one-eighth (⅛) the size of the fanned graphical marker. In such a case, the optimum number of plotted points is eight plotted points with identifiers that are clearly visible to a user. In other words, the fanned graphical marker can optimally represent a maximum of eight graphical markers representing eight plotted points. In order to represent additional plotted points in excess of the optimal number of plotted points, a size of each wedge graphical marker in the fanned graphical marker is adjusted to permit additional graphical markers to be displayed as part of the fanned graphical marker. However, as the graphical size of each wedge graphical marker is diminished, the detail visible to a user is also diminished.

In accordance with another illustrative embodiment, in order to represent additional plotted points in excess of the optimal number of plotted points a second display page is linked to the fanned graphical marker. The second display page includes a result set listing each plotted point represented by the wedge graphical markers comprising the fanned graphical marker. When a user clicks on the fanned graphical marker or otherwise selects the fanned graphical, the result list in the second display is presented to the user detailing the list of points represented by the fanned graphical marker.

In another illustrative embodiment, a set if fanned markers is linked to a second display. The second display presents at least a portion of the associated data about locations for the plurality of points represented by the graphical markers arranged in the fan-shaped manner. In other words, a user can obtain additional information regarding each point represented by a graphical indicator in the set of fanned markers by selecting to view a second display screen providing a listing of data regarding the point and/or location represented by the selected graphical marker. In this example, a user can select a graphical marker in the set of fanned markers by clicking on the graphical marker.

In accordance with another illustrative embodiment, a user can click on the fanned graphical marker to select a fanned out display option. A fanned out display option changes a zoom level of the given map display to the appropriate magnification or zoom level at which each graphical marker in the set of overlapping graphical markers is no longer overlapping with any other graphical marker. In other words, as a user zooms in on a map display, the magnification level increases and the degree of overlap of graphical markers decreases. In accordance with this illustrative embodiment, if a user clicks on a set of fanned graphical markers representing a set of points, the map marker overlap engine automatically changes the zoom level of the map display to the second zoom level at which each graphical marker in the set of fanned graphical markers is non-overlapping graphical marker. At this second zoom level, the graphical markers for the set of points do not need to be displayed in a fanned arrangement to avoid overlap of the graphical markers because at this second zoom level the graphical markers are sufficiently spaced apart so that overlap of the markers no longer occurs.

In accordance with another illustrative embodiment, each graphical marker is configurable. A configurable graphical marker can be configured by a user to indicate that a given graphical marker is an overlapping marker by changing a color of the graphical marker, changing a shape of the graphical marker, changing a border or outline of the graphical marker, adding a shading or shadow to the graphical marker or any combination of changes to the graphical marker to indicate that the graphical marker is overlapping, hiding or obscuring one or more other graphical markers. A configurable graphical marker is a user configured graphical marker. In accordance with another illustrative embodiment, a configurable graphical marker is a pre-configured graphical marker with one or more default configurations that may be modified or altered by a user.

In accordance with another illustrative embodiment, an overlap detection determination is made based on a distance of a plotted point from a fixed reference point. A fixed reference point may be any point designated as a fixed reference point, including but not limited to, a center of a city, a body of water, a state, a country, a continent, and/or any other natural or artificial geographic location or point of interest.

FIG. 6 is a flowchart illustrating a process for displaying a set of overlapping graphical markers in a non-overlapping arrangement by using a fanned technique in accordance with an illustrative embodiment. The process is performed by a mapping application, such as map marker overlap engine 510 in FIG. 5.

The process begins by determining a zoom level for a given map display (step 610). The process next determines pixel values for each point in the set of points with associated geospatial data obtained from a data set (step 620) to from a plurality of plotted points. The process identified a given unprocessed point (step 630) in the plurality of points. As used herein, an unprocessed point is a point that has not been processed to determine if the point overlaps with any other point in the plurality of plotted points.

The process determines if a graphical marker for the given plotted point overlaps with any other graphical marker (step 640). If the given graphical marker does overlap with any other graphical marker, the process flags the pair of points (step 650) represented by the pair of overlapping graphical markers. If the process determines that the graphical marker does not overlap with any other graphical marker, the process determines if any other plotted points in the set of plotted points are unprocessed (step 660). If any plotted points are unprocessed points, the process returns to step 630 and continues to perform steps 630-660 iteratively until all plotted points are processed to determine if a graphical marker for each point overlaps with any other graphical marker. The process then displays the identified set of overlapping markers using a fanned technique (step 670).

The process determines if the zoom level of the given map display has been changed (step 680). If the zoom level has been changed, the process returns to step 620. If the process determines that a zoom level has not been changed, the process terminates thereafter.

FIG. 7 is an example of an algorithm for converting geospatial data associated with a data set to pixel values to form a set of plotted points. The code shown in FIG. 7 is implemented by a mapping application, such as map marker overlap engine 510 in FIG. 5.

Code 710 is an algorithm for a function to convert latitude and longitude coordinates of the map bounding box into a pixel value for the horizontal x-axis 620 and a pixel value for the vertical y-axis 730 of each point relative to the bounding box for the map display to form the set of plotted points.

The map marker overlap engine determines whether or not a graphical marker for each point in a pair of plotted points overlaps. This determination is made for every plotted point by comparing a pixel value for each plotted point and a known graphical marker pixel size with a pixel value for every other plotted point in the plurality of plotted points. Thus, an overlap determination is made for each pair of graphical markers representing each pair of plotted points for a total of $N^2$ comparisons, where N is the total number of plotted points in the plurality of plotted points. In accordance with an illustrative embodiment, the total number of comparisons is optimized such that the total number of comparisons is less than $N^2$ comparisons.

FIG. 8 is overlap-detection function for identifying a pair of overlapping graphical markers in accordance with an illustrative embodiment. The code shown in FIG. 8 is implemented by a mapping application, such as map marker overlap engine 510 in FIG. 5.

Code 800 is a pseudocode for an overlap-detection function to determine if a graphical marker for a first plotted point overlaps with a graphical marker for a second plotted point. Each plotted point has an associated graphical marker of a known size. A comparison is made of the known dimensions of the bounding box of a graphical marker to determine if the graphical marker overlaps with the second graphical marker. In accordance with pseudocode 810, if either a left bound or a right bound of a bounding box associated with the first graphical marker, identified as graphical marker A, falls between a left and right bounds of the bounding box for the second graphical marker, identified as graphical marker B and either a top bound or a bottom bound of the first graphical marker falls between an upper and lower bound of the bounding box associated with the second graphical marker, then the two plotted points are identified as overlapping at line of code 820. If the bounding boxes associated with the two graphical markers do not overlap, then the two plotted points represented by the two graphical markers are not identified as a pair of overlapping graphical markers.

Thus, in accordance with this illustrative embodiment, the map marker overlap engine compares the known dimensions of the bounding boxes associated with two graphical markers representing two plotted points to determine if the bounding boxes overlap. If the bounding boxes overlap in whole or in part, then map marker overlap engine flags the pair of plotted points as points having overlapping graphical markers. The pair of overlapping graphical markers form a set of overlapping graphical markers. A set of overlapping graphical markers can include two or more overlapping graphical markers. Each graphical marker in the set of overlapping graphical markers overlaps with at least one other graphical marker in the set of overlapping graphical markers. As used herein, a graphical marker that overlaps with another graphical marker includes a graphical marker that hides or obscures another graphical marker, in addition to a graphical marker that is itself hidden or obscured by another graphical marker. For example, a set of overlapping markers can include a single graphical marker that hides or obscures two other graphical markers in a stacked manner. In such a case, all three markers, the top marker, the middle marker, and the bottom marker, are overlapping graphical markers.

Map marker overlap engine determines whether each pair of graphical markers representing a pair of plotted points in the plurality of plotted points are overlapping graphical markers. In accordance with this illustrative example, approximately $N^2$ overlap detection determinations are made. For example, if the plurality of plotted points includes only four points, then sixteen (16) overlap determinations are made. In accordance with another illustrative embodiment, the number of overlap determinations can be optimized. Thus, if there are four plotted points in the plurality of plotted points, A, B, C, and D, then map marker overlap engine performs an overlap detection determination as to each of the following pairs of points: A and B, A and C, A and D, B and A, B and C, B and D, C and A, C and B, C and A, D and A, D and B, and D and C. Therefore, a minimum of twelve (12) overlap-detection determinations are made rather than sixteen (16).

After comparing all points in the plurality of plotted points, map marker overlap engine determines which plotted points are represented by overlapping graphical markers. Map marker overlap engine identifies set(s) of overlapping graphical markers. Each set of overlapping markers is plotted for display in an arrangement that prevents overlap of graphical markers. For example, an arrangement that prevents overlap of graphical markers includes a fanned manner. In a fanned arrangement, each graphical marker is displayed in a fan-shaped set of graphical markers in which each graphical marker does not overlap with any other graphical marker. The set of graphical markers displayed in a fanned manner forms a set of fanned markers. In accordance with an illustrative embodiment, the set of fanned markers is a pre-generated image.

When large data sets representing a plurality of points are mapped, the graphical markers may overlap when displayed on a map display. Overlap of markers can occur when two or more points actually have the same location. Overlap can also occur when two or more graphical markers overlap due to the zoom level of the map view. Overlapping of graphical markers on a map results in problems because the overlap hides or obscures some of the data intended to be represented on the map display. This obscuring of data can cause confusion to a user.

Thus, the aspects of the illustrative embodiments provide a method, apparatus, and computer program product for rendering graphical markers in a manner that avoids overlap of graphical markers on a map display. Graphical markers that would overlap when displayed in a given zoom level are arranged using a fanned technique. By displaying graphical markers for a set of points in a fanned manner, the identifier for each graphical marker is clearly visible and/or un-obscured by any other graphical marker for a set of points. Thus, a user is able to identify each location and/or point represented by a graphical marker on the map display. In this way, data represented by graphical markers is not lost, hidden, or obscured by overlapping markers.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for rendering graphical markers in a manner that avoids overlap of graphical markers on a map display, the computer implemented method comprising;
   identifying a plurality of points for display from data describing locations and associated data about locations;
   determining whether displaying graphical markers for a set of points in the plurality of points will result in graphical markers overlapping each other; and
   responsive to a determination that displaying graphical markers for the set of points will result in graphical markers overlapping each other, displaying the graphical markers for the set of points in an arrangement that avoids overlap, wherein each graphical marker representing a point in the set of points does not overlap with any other graphical marker associated with the map display when displayed in the arrangement that avoids overlap, further comprising:
   displaying the graphical markers in a fan-shaped arrangement to form a set of fanned markers, wherein each graphical marker in the set of fanned graphical markers does not overlap with any other graphical marker.

2. The computer implemented method of claim 1 further comprising:
   determining whether a given pair of graphical markers associated with a pair of points overlap based on a distance of a physical distance between pixels associated with the pair of points relative to a bounding box of the map display.

3. The computer implemented method of claim 1 further comprising:
   determining whether a given pair of graphical markers associated with a pair of points overlap based on a distance between the pair of points and a fixed reference point.

4. The computer implemented method of claim 1 further comprising:
   determining if a graphical marker for a given plotted point in the plurality of plotted points overlaps with any other graphical marker associated with the map display.

5. The computer implemented method of claim 1 further comprising:
   determining a zoom level for the map display.

6. The computer implemented method of claim 1 wherein geospatial data comprises longitude and latitude coordinates for a given point.

7. The computer implemented method of claim 1 wherein the set of fanned markers is a pre-generated graphical image.

8. The computer implemented method of claim 1 further comprising:
   displaying the set of fanned markers at a central point associated with the graphical markers for the set of points.

9. The computer implemented method of claim 1 further comprising:
   responsive to a user selecting the set of fanned markers, changing a first zoom level of the map display to a second zoom level, wherein each graphical marker for the set of points will not overlap with any other graphical marker for the set of points when the graphical markers are not displayed in a fan-shaped arrangement at the second zoom level.

10. The computer implemented method of claim 1 wherein a graphical marker is a user configurable graphical marker.

11. The computer implemented method of claim 1 wherein a graphical marker does not overlap with any other marker associated with the map display if an identifier associated with the graphical marker is not obscured by any other graphical marker associated with the map display.

* * * * *